(12) United States Patent
Monse et al.

(10) Patent No.: US 10,928,240 B2
(45) Date of Patent: Feb. 23, 2021

(54) VIBRONIC SENSOR WITH INTERFERENCE COMPENSATION

(71) Applicant: Endress+Hauser SE+Co. KG, Maulburg (DE)

(72) Inventors: Benjamin Monse, Vogtsburg (DE); Michael Dötsch, Bickenbach (DE); Tobias Weber, Rheinfelden (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 105 days.

(21) Appl. No.: 16/471,119

(22) PCT Filed: Dec. 1, 2017

(86) PCT No.: PCT/EP2017/081127
§ 371 (c)(1),
(2) Date: Jun. 19, 2019

(87) PCT Pub. No.: WO2018/114281
PCT Pub. Date: Jun. 28, 2018

(65) Prior Publication Data
US 2020/0041326 A1 Feb. 6, 2020

(30) Foreign Application Priority Data
Dec. 19, 2016 (DE) ...................... 10 2016 124 740.5

(51) Int. Cl.
*G01F 23/296* (2006.01)
*G01F 25/00* (2006.01)
(Continued)

(52) U.S. Cl.
CPC ...... *G01F 23/2967* (2013.01); *G01F 25/0061* (2013.01); *G01N 9/002* (2013.01); *G01N 11/16* (2013.01); *G01N 2009/006* (2013.01)

(58) Field of Classification Search
CPC .... G01F 1/8422; G01F 1/8477; G01F 1/8413; G01F 1/8427; G01F 1/8436;
(Continued)

(56) References Cited

U.S. PATENT DOCUMENTS

| 2010/0088067 A1 | 4/2010 | Jensen |
| 2016/0109285 A1* | 4/2016 | Brengartner .......... G01F 23/296 702/56 |

(Continued)

FOREIGN PATENT DOCUMENTS

| CN | 1726383 A | 1/2006 |
| CN | 200947051 Y | 9/2007 |

(Continued)

*Primary Examiner* — Andre J Allen
(74) *Attorney, Agent, or Firm* — Mark A. Logan; Endress+Hauser (USA) Holding Inc.

(57) ABSTRACT

The present disclosure relates to a method for determining a process variable of a medium by means of a vibronic sensor. In a first operating mode, an oscillatable unit is excited by a first electrical excitation signal, such that it executes mechanical oscillations, and the mechanical oscillations of the mechanically oscillatable unit are received and converted into a first electrical, received signal having a first frequency. Furthermore, the first received signal is evaluated relative to the process variable. In a second operating mode, mechanical oscillations of the oscillatable unit are received and converted into a second electrical, received signal, wherein a second frequency of the second electrical, received signal is ascertained, and wherein the second frequency is associated with a first disturbing influence for the vibronic sensor. Furthermore, the present disclosure relates to an apparatus, which is suitable for performing a method of the present disclosure.

16 Claims, 3 Drawing Sheets

(51) Int. Cl.
*G01N 9/00* (2006.01)
*G01N 11/16* (2006.01)

(58) Field of Classification Search
CPC ...... G01F 25/0007; G01F 15/022; G01F 1/05; G01F 1/58; G01F 1/66; G01F 1/8409; G01F 1/8418; G01F 1/8431; G01F 1/844; G01F 1/8472; G01F 1/8495; G01F 23/2962; G01F 23/2967; G01F 23/2968
See application file for complete search history.

(56) References Cited

U.S. PATENT DOCUMENTS

| | | | | |
|---|---|---|---|---|
| 2017/0343459 | A1* | 11/2017 | Brengartner | G01H 11/06 |
| 2018/0031460 | A1* | 2/2018 | Brengartner | G01N 9/002 |
| 2019/0226900 | A1* | 7/2019 | Brengartner | G01N 9/002 |
| 2019/0257683 | A1* | 8/2019 | Kuhnen | G01N 9/002 |
| 2019/0339107 | A1* | 11/2019 | D'Angelico | G01N 9/002 |
| 2019/0368914 | A1* | 12/2019 | Brengartner | G01N 11/16 |
| 2020/0116545 | A1* | 4/2020 | Vogt | G01F 25/0061 |
| 2020/0132533 | A1* | 4/2020 | Welle | G01S 7/292 |
| 2020/0264087 | A1* | 8/2020 | Berlinger | G01N 9/002 |
| 2020/0340896 | A1* | 10/2020 | MacK | G01F 23/2967 |

FOREIGN PATENT DOCUMENTS

| | | |
|---|---|---|
| CN | 101358868 A | 2/2009 |
| CN | 101842687 A | 9/2010 |
| DE | 10050299 A1 | 4/2002 |
| DE | 10057974 A1 | 5/2002 |
| DE | 10131081 A1 | 1/2003 |
| DE | 102005015547 A1 | 10/2006 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102012101667 A1 | 8/2013 |
| DE | 102014118393 A1 | 6/2016 |
| DE | 102015102834 A1 | 9/2016 |
| EP | 3056877 A1 | 8/2016 |

* cited by examiner

VIBRONIC SENSOR WITH INTERFERENCE COMPENSATION

CROSS-REFERENCE TO RELATED APPLICATIONS

The present application is related to and claims the priority benefit of German Patent Application No. 10 2016 124 740.5, filed on Dec. 19, 2016 and International Patent Application No. PCT/EP2017/081127, filed on Dec. 1, 2017, the entire contents of which are incorporated herein by reference.

The invention relates to a method as well as to an apparatus for determining and/or monitoring at least one process variable of a medium in a container. Alternatively, the medium, for which a process variable is determined, can also be located in a pipe, tube or pipeline. The apparatus is a so-called vibronic sensor.

BACKGROUND

Vibronic sensors find multiple application in process and/or automation technology. In the case of fill-level measuring devices, such have at least one mechanically oscillatable unit, such as, for example, an oscillatory fork, a single tine or a membrane. Such is excited during operation by means of a driving/receiving unit, frequently in the form of an electromechanical transducer unit, such that it executes mechanical oscillations. The driving/receiving unit can be, for example, a piezoelectric drive or an electromagnetic drive. The mechanically oscillatable unit can in the case of flow measuring devices, however, also be embodied as an oscillatable tube, which is flowed through by the medium, such as, for example, in a measuring device working according to the Coriolis principle.

Corresponding field devices are manufactured by the applicant in great variety and, in the case of fill-level measuring devices, for example, sold under the marks, LIQUIPHANT and SOLIPHANT. The underpinning measuring principles are known, in principle, from a large number of publications. The driving/receiving unit excites the mechanically oscillatable unit by means of an electrical excitation signal, such that the mechanically oscillatable unit executes mechanical oscillations. Conversely, the driving/receiving unit can receive the mechanical oscillations of the mechanically oscillatable unit and convert such into an electrical, received signal. The driving/receiving unit can be either a separate driving unit and a separate receiving unit, or a combined driving/receiving unit.

The driving/receiving unit is in many cases part of a fed back, electrical, oscillatory circuit, by means of which the mechanically oscillatable unit is excited, such that it executes mechanical oscillations. For a resonant oscillation, the oscillatory circuit condition must be fulfilled, according to which the amplification factor is and all phases arising in the oscillatory circuit must add to a multiple of 360°.

For exciting and fulfilling the oscillatory circuit condition, a certain phase shift between the excitation signal and the received signal must be assured. Therefore, frequently a predeterminable value for the phase shift, thus, a desired value for the phase shift, is set between the excitation signal and the received signal. For this, the most varied of solutions, both analog as well as also digital methods, are known from the state of the art. In principle, the setting of the phase shift can be performed, for example, by application of a suitable filter, or even be controlled by means of a control loop to a predeterminable phase shift, the desired value.

Known from DE102006034105A1 is to use, for example, a tunable phase shifter. The additional integration of an amplifier with adjustable amplification factor for additional control of the oscillation amplitude is, in contrast, described in DE102007013557A1. DE102005015547A1 provides the application of an allpass filter. The setting of the phase shift is, moreover, possible by means of a so-called frequency sweep, such as, for example, disclosed in DE102009026685A1, DE102009028022A1, and DE102010030982A1. The phase shift can, however, also be controlled by means of a phase control loop (phase-locked loop, or PLL) to a predeterminable value. Such an excitation method is subject matter of DE00102010030982A1.

Both the excitation signal as well as also the received signal are characterized by frequency $\omega$, amplitude A and/or phase $\Phi$. Correspondingly, changes in these variables are usually taken into consideration for determining the particular process variable, such as, for example, a predetermined fill level of a medium in a container, or even the density and/or viscosity of a medium or the flow of a medium through a pipe. In the case of a vibronic, limit level switch for liquids, for example, it is distinguished whether the oscillatable unit is covered by the liquid or freely oscillating. These two states, the free state and the covered state, are, in such case, distinguished, for example, based on different resonance frequencies, thus, a frequency shift. The density and/or viscosity, in turn, can be ascertained with such a measuring device only when the oscillatable unit is covered by the medium.

As described, for example, in DE10050299A1, the viscosity of a medium can be determined by means of a vibronic sensor based on the frequency-phase curve ($\Phi = g(\omega)$). This procedure is based on the dependence of the damping of the oscillatable unit on the viscosity of the medium. In such case, the lower the viscosity, the steeper the frequency-phase curve falls. In order to eliminate the influence of the density on the measurement, the viscosity is determined based on a frequency change caused by two different values for the phase, thus, by means of a relative measurement. In this regard, either two different phase values can be set and the associated frequency change determined, or a predetermined frequency band is traversed and it is detected when at least two predetermined phase values are achieved.

Known from DE102007043811A1, moreover, is to ascertain a change of viscosity from a change of eigenfrequency and/or resonant frequency and/or the phase difference and/or to determine the viscosity based on correspondedly stored dependencies of the oscillations of the oscillatable unit on the viscosity of the medium. Also in this case, the dependence of the determining of viscosity on the density of the medium must be taken into consideration.

Known from DE10057974A1 for determining and/or monitoring the density of a medium are a method as well as an apparatus, by means of which the influence of at least one disturbing variable, for example, the viscosity, on the oscillation frequency of the mechanically oscillatable unit can be ascertained and correspondingly compensated. Furthermore, described in DE102006033819A1 is to set a predeterminable phase shift between the excitation signal and the received signal, in the case of which effects of changes of the viscosity of the medium on the mechanical oscillations of the mechanically oscillatable unit are negligible. In such case, the density is essentially determined by the formula $$\rho_{Med} = \frac{1}{K}\left[\left(\frac{f_{0,Vak} + C \cdot t + A \cdot t^2}{f_{T,P,Med}}\right)^2 \cdot (1 + D \cdot p) - 1\right]$$

wherein K is the density sensitivity of the mechanically oscillatable unit, $F_{0,vak}$ the frequency of the mechanical oscillations in vacuum, C and A the linear and square temperature coefficients, respectively, of the mechanically oscillatable unit, t the process temperature, $F_{T,P,med}$ the frequency of the mechanical oscillations in the medium, D the pressure coefficient, and p the pressure of the medium.

In order to be independent of empirical assumptions, known from DE102015102834A1 is an analytical measuring principle for determining density and/or viscosity by means of a vibronic sensor. This principle takes into consideration interactions between the oscillatable unit and the medium based on a mathematical model. The sensor is operated at two different predeterminable phase shifts and the process variables, density and/or viscosity, ascertained from the response signal.

Independently of which process variable is determined and/or monitored by means of a vibronic sensor, various disturbing influences can negatively influence the accuracy of measurement of the sensor. Problematic are especially unwanted vibrations, which can be caused, for example, by pumps and/or ultrasonic baths at the location of use of the sensor. Known in this regard from Offenlegungsschrift DE102012101667A1 is a vibronic sensor, in the case of which a control/evaluation unit is configured in the presence of at least one unwanted vibration to control the oscillation excitement as a function of frequency and/or amplitude of the unwanted vibration in such a manner that the received signal is essentially undisturbed by the unwanted vibration, and/or to suppress at least one frequency of an unwanted vibration in the received signal. For this, however, in principle, knowledge concerning the particular unwanted vibration is required.

SUMMARY

Starting from the state of the art, an object of the present invention is to assure, in simple manner, an as reliable as possible determining and/or monitoring of a process variable of a medium by means of a vibronic sensor.

This object is achieved by the method as claimed in claim 1 as well as by the apparatus, which is embodied as claimed in claim 13 for performing a method of the invention.

In the case of the method, of concern is a method for determining and/or monitoring at least one process variable of a medium by means of a vibronic sensor. According to the invention, in a first operating mode, a mechanically oscillatable unit is excited by means of a first electrical excitation signal, such that it executes mechanical oscillations, and the mechanical oscillations of the mechanically oscillatable unit are received and converted into a first electrical, received signal with at least a first frequency. Furthermore, the first received signal is evaluated relative to the at least one process variable. Furthermore, in a second operating mode, mechanical oscillations of the oscillatable unit are received and converted into a second electrical, received signal, wherein at least a second frequency of the second electrical, received signal is ascertained, and wherein the at least a second frequency is associated with at least a first disturbing influence for the vibronic sensor. Optionally, then, for example, a report concerning the presence of at least one disturbing influence, especially the frequency associated with the disturbing influence, can be generated and output.

According to the invention, thus, during the second operating mode, no second excitation signal for supplying the oscillatable unit is produced. Rather, oscillations of the oscillatable unit, which are caused by at least one disturbing influence, can be detected. In this regard, those disturbing influences are of meaning, which lead to an oscillation of the oscillatable unit with at least one determined frequency. The oscillations of the oscillatable unit caused by the at least one disturbing influence provide, namely besides the intended oscillations caused by the first excitation frequency, likewise a contribution, especially an unwanted contribution, to the first received signal.

Advantageously for compensating the at least one disturbing influence, such does not have to be a priori known. Rather, in given cases present, disturbing influences at the location of use of the vibronic sensor can be directly detected, taken into consideration and, in given cases, compensated and/or eliminated. The terminology, compensated, refers in this connection, for example, to a calculational compensation of the at least one disturbing influence. The at least one disturbing influence can, to the extent that its cause is known, however, also be eliminated at the location of use of the vibronic sensor. The at least a second frequency of the disturbing influence ascertained by means of the method of the invention can, in such case, in given cases, provide information concerning possible causes.

The second operating mode can, in such case, on the one hand, be performed once upon start-up at the location of use. On the other hand, the second operating mode can also be executed repeatedly at determinable points in time, especially executed cyclically repeatedly in determinable time intervals.

In an embodiment of the method, a state monitoring is performed based on a comparison at least of the first and the second received signals, especially the first frequency and the second frequency. In such case, of concern is especially information about the oscillatory behavior of the vibronic sensor.

Advantageously, based on the comparison, it is detected, whether the first received signal is influenced by the disturbing influence. In such case, the mechanical oscillations are influenced by the presence of a disturbing influence. The first received signal includes both a part caused by the first excitation signal, as well as also a part caused by the at least one disturbing influence. Based on a comparison of the first and second received signals, among other things, the extent of the influencing by the at least one disturbing influence can be determined. For example, the frequency separation between the at least a first frequency of the first received signal, which represents the oscillations of the oscillatable unit, and the at least a second frequency, which represents the at least one disturbing influence, plays an important role. If the values for the first and second frequencies essentially agree, it can be concluded that the oscillations of the oscillatable unit are decisively influenced by the at least one disturbing influence. In the worst case, the oscillatable unit oscillates not corresponding to the electrical first excitation signal, but, instead, corresponding to the at least one disturbing influence. In this extreme case, a reliable determining and/or monitoring of the at least one process variable is no longer possible.

In an embodiment of the method of the invention, the oscillatable unit is excited in the first operating mode, such that it executes mechanical oscillations with a resonant frequency.

Furthermore, in an embodiment of the method, during the first operating mode, the first excitation signal is produced starting from the first received signal in such a manner that at least a predeterminable phase shift is present between the first excitation signal and the first received signal. A phase shift of +/−90° corresponds, for example, to resonant oscillations of the oscillatable unit, while a phase shift of +/−45° is set in many cases for determining the density and/or viscosity of a medium by means of a vibronic sensor.

Advantageously, the at least a first disturbing influence is an oscillation, especially a mechanical or electrical oscillation. Mechanical oscillations are in this connection frequently also referred to as unwanted vibrations. Such unwanted vibrations can be caused, for example, by pumps or motors likewise installed at the location of use of the vibronic sensor. Furthermore, vibrations can be present, which are brought about by flow of a medium. However, also ultrasonic baths lead easily to unwanted vibrations, which influence the oscillatory behavior of an oscillatable unit of a vibronic sensor. This list is in no way exclusive. Rather, numerous possible causes for the occurrence of unintended mechanical and/or electrical oscillations are possible, which all fall within the scope of the present invention.

A preferred embodiment of the method provides that in a third operating mode a third electrical excitation signal is produced, wherein the oscillatable unit is excited by means of the third excitation signal, wherein a third electrical, received signal with at least a third frequency is received from the oscillatable unit. The third received signal is formed, thus, in the case of the presence of a disturbing influence, same as the first received signal, by a part caused by the excitation signal and a part caused by the disturbing influence.

Advantageously, the first and/or third excitation signal is a signal of variable frequency. For example, the oscillatable unit of this embodiment can be fed a so-called frequency sweep. For instance, the frequency sweep can involve discrete frequencies as a predeterminable frequency range is sequentially moved through. The performing of such frequency sweeps in the context of vibronic sensors, among other things combined with the setting of the predeterminable phase shift between an excitation signal and received signal, is known and described, for example, in the documents, DE102009026685A1, DE102009028022A1, and DE102010030982A1.

The frequency range for the first and/or third excitation signal preferably includes a working range for an oscillation frequency of the oscillatable unit. Should the frequency range be limited to this working range, an upper limit value for the frequency range can be, for example, a resonant frequency of the oscillatable unit in vacuum. A lower limit value can, in turn, be the resonant frequency of an oscillatable unit at a predetermined penetration depth of the oscillatable unit into a medium having a maximum acceptable density for the application domain of the vibronic sensor. Especially frequencies brought about by disturbing influences within the frequency-working range of the vibronic sensor can be problematic for a reliable determining of the particular process variable.

It is, furthermore, advantageous that based on the first, second and/or third received signal, a first, second and/or third frequency spectrum of the vibronic sensor be produced. Based on a frequency spectrum, the particular relevant frequencies can be ascertained in simple and fast manner. The second frequency spectrum does not include the frequencies corresponding to the oscillations of the oscillatable unit. Based on these spectra, it can, for example, be ascertained, which frequencies caused by at least one disturbing influence provide a contribution to a particular received signal.

In an especially preferred embodiment of the method, the second and/or third operating modes are/is performed at least at first and second points in time, wherein, based on a comparison of the second and/or third received signal at the first and second points in time, the presence of a defect of at least one component at or in a measuring point, at or in which the vibronic sensor is applied, or the presence of a changed process state, is determined. For example, the intensity of a frequency can be ascertained as a function of time.

If the intensity of a characteristic frequency—that is at least a second frequency, which is caused by at least one disturbing influence—, for example, increases with time, especially significantly, then this means that also the associated disturbing influence increases with time. Involved, in this case, can be, for example, a defect in a motor or pump.

Alternatively, the presence of new disturbing influences occurring in the course of use of the vibronic sensor at its location of use can be determined, when, for example, new characteristic frequencies occur in the second and/or third received signal.

Another especially preferred embodiment of the method includes that from the second and/or third received signal, especially from the second and/or third frequency or from the second and/or third frequency spectrum, an adapted first received signal, especially at least an adapted first frequency or an adapted first frequency spectrum, is produced, and wherein the at least one process variable is determined and/or monitored from the first adapted received signal. The fraction of the first received signal, which is brought about by the at least a first disturbing influence, is, thus, suitably compensated for determining and/or monitoring the at least one process variable. For example, a first and a second or third frequency spectrum can be subtracted from one another.

Advantageously, the process variable is a predetermined fill level of medium in a container, the density of the medium and/or the viscosity of the medium.

The object of the invention is achieved, furthermore, by an apparatus for determining and/or monitoring at least one process variable of a medium in a container, comprising an electronics unit and a mechanically oscillatable unit, wherein the electronics unit is embodied to execute at least one method of the invention.

Regarding the apparatus, it is advantageous that the electronics unit have at least one switch element for switching back and forth between the first and second operating modes, or at least two switch elements for switching back and forth between the first, second and/or third operating modes. Likewise it is advantageous that the mechanically oscillatable unit be an oscillatory fork, a single tine, or a membrane.

It is to be noted here that the forms of embodiment disclosed in connection with the method of the invention can be used mutatis mutandis also for the apparatus of the invention and vice versa.

BRIEF DESCRIPTION OF THE DRAWINGS

The invention as well as advantageous embodiments will now be described in greater detail based on the appended drawing, the figures of which show as follows.

DETAILED DESCRIPTION

Figure 1:
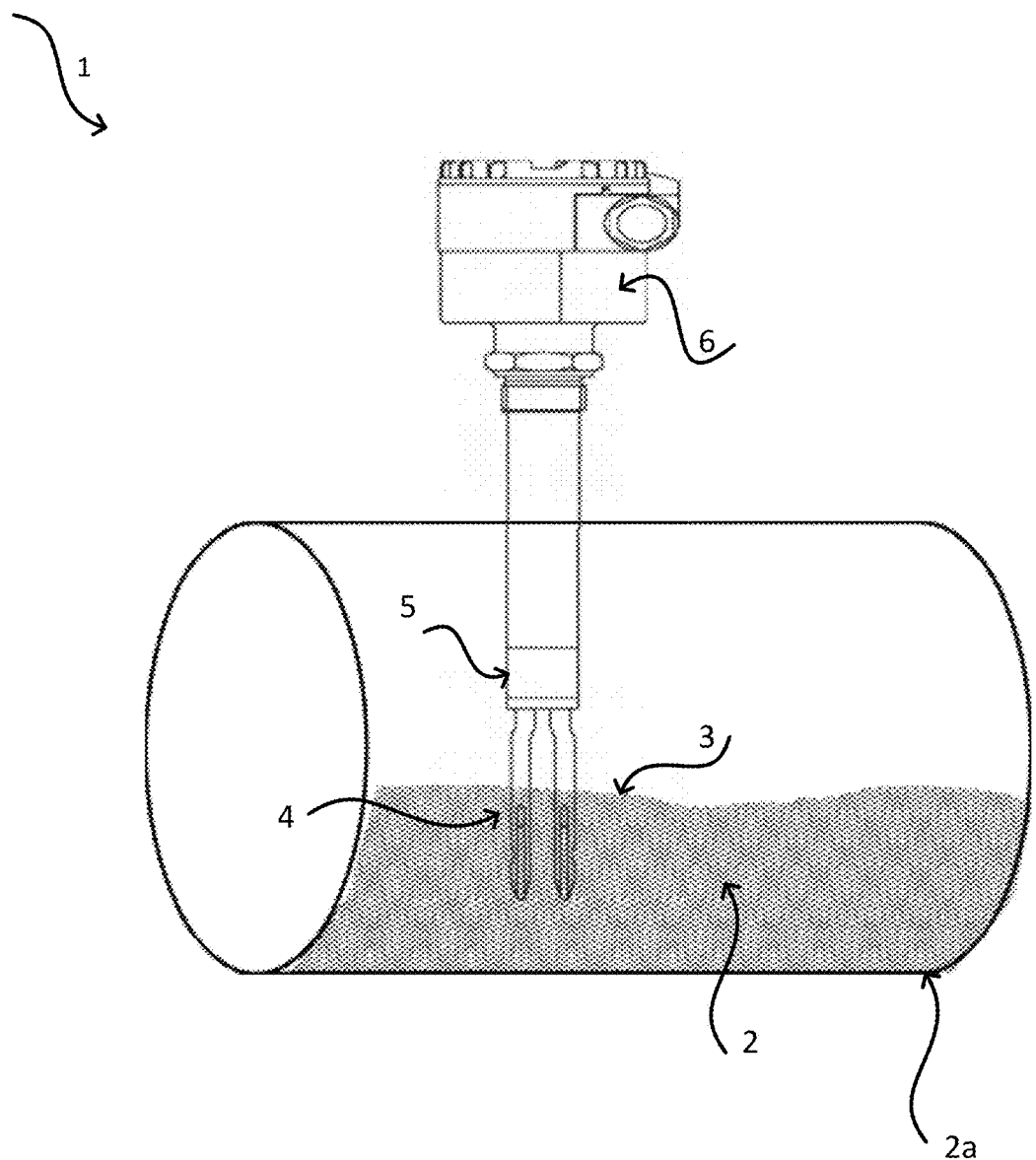
FIG. 1 shows a schematic view of a vibronic sensor of the state of the art.

Equal elements are provided in the figures with equal reference characters.

FIG. 1 shows a vibronic sensor 1 having a sensor unit 3 comprising an oscillatable unit 4 in the form of an oscillatory fork, which is partially immersed in a medium 2 located in a container 2a. The oscillatable unit is excited by means of the exciter/receiving unit 5, such that it executes mechanical oscillations, and can be, for example, a piezoelectric stack- or bimorph drive. It is understood, however, that also other embodiments of a vibronic sensor fall within the scope of the invention. Further provided is an electronics unit 6, by means of which signal registration, —evaluating and/or—feeding occurs.

Figure 2:
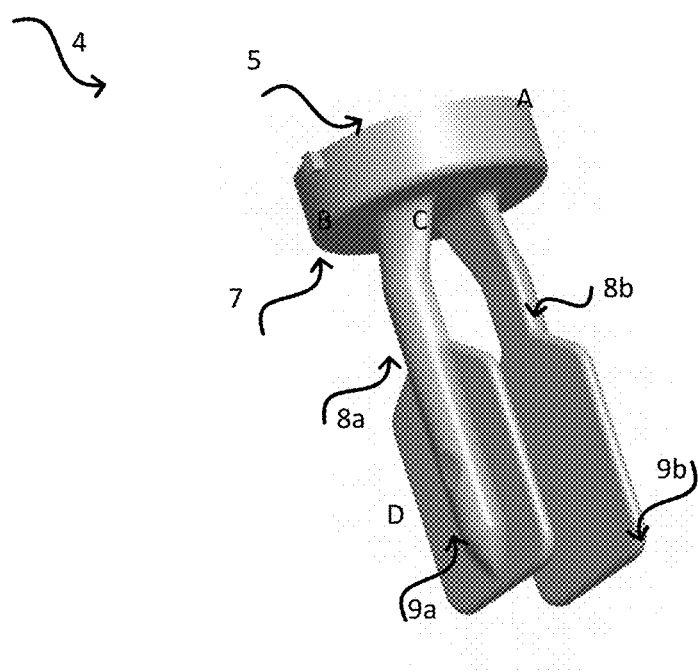
FIG. 2 shows a schematic drawing of an oscillatable unit in the form of an oscillatory fork.

FIG. 2 shows in side view an oscillatable unit 4 in the form of an oscillatory fork, such as integrated, for example, in the vibronic sensor 1 sold by the applicant under the mark, LIQUIPHANT. The oscillatory fork 4 includes, formed on a membrane 7, two oscillatory tines 8a,8b, on which two paddles 9a,9b are formed terminally. The oscillatory tines 8a,8b together with the paddles 9a,9b are frequently also referred to as fork tines. In order to cause the mechanically oscillatable unit 4 to execute mechanical oscillations, a force is exerted on the membrane 7 by means of a driving/receiving unit 5 mounted by material bondng on the side of the membrane 7 away from the oscillatory tines 8a,8b. The driving/receiving unit 5 is an electromechanical transducer unit, and comprises, for example, a piezoelectric element, or even an electromagnetic drive [not shown]. Either the driving unit 5 and the receiving unit 5 are embodied as two separate units, or as a combined driving/receiving unit 5. In the case, in which the driving/receiving unit 5 comprises a piezoelectric element, the force exerted on the membrane 7 is generated by applying an excitation signal $U_E$, for example, in the form of an electrical alternating voltage. A change of the applied electrical voltage effects a change of the geometric shape of the driving/receiving unit 5, thus, a contraction, or relaxation, within the piezoelectric element in such a manner that the applying of an electrical alternating voltage as excitation signal $U_E$ brings about an oscillation of the membrane 7 connected by material bondng with the driving/receiving unit 5. Conversely, the mechanical oscillations of the oscillatable unit are transmitted via the membrane to the driving/receiving unit 5 and converted into an electrical, received signal $U_R$. The frequency of the received signal $U_R$ corresponds, in such case, to the mechanical oscillation frequency f of the oscillatable unit 4.

In the case, in which at least one disturbing influence, for example, in the form of an arising mechanical, unwanted vibration, occurs at the location of use of the vibronic sensor, the disturbing influence also produces a contribution to the received signal. Due to this additional, especially unwanted contribution, inaccuracies can occur in the determining and/or monitoring of the at least one process variable. In the worst case, a reliable determining and/or monitoring is no longer possible at all.

By means of the method of the invention, and by means of a vibronic sensor 1 of the invention, advantageously, disturbing influences can be detected, taken into consideration, compensated and/or eliminated. For this, the disturbing influence does not have to be a priori known. Rather, by means of the present invention, at least one, second frequency associated with the disturbing influence can be detected. For the subsequent description, without intending to limit the general applicability of the invention, for purposes of simplification, it is assumed that the disturbing influence is a mechanical oscillation, especially an unwanted vibration. For other types of disturbing influences, for example, electrical oscillations, analogous considerations hold, so that these additional cases are not explored in further detail.

Mechanical, unwanted vibrations at the location of use of a vibronic sensor can have the most varied of causes. For example, involved can be a motor, especially a defective motor, a pump, an ultrasonic bath, or the like. However, also flowing medium can bring about an unwanted vibration. Since the vibronic measuring principle fundamentally is based on the execution of mechanical oscillations of an oscillatable unit, and because changes in the oscillatory behavior of the oscillatable unit are taken into consideration for determining and/or monitoring the particular process variable, the achievable accuracy of measurement depends sensitively on whether unwanted vibrations are present, and, if they are present, on their exact nature.

If an oscillation of the oscillatable unit is composed of a signal portion caused by the particular excitation signal, as well as a signal portion caused by a disturbing influence, then the particularly present disturbing influence decisively influences the determining and/or monitoring of the process variable based on the received signal received from the oscillatable unit, since the received signal is likewise composed of a signal portion representing the oscillations of the oscillatable unit and a signal portion representing the at least one disturbing influence. Depending on intensity and frequency of the disturbing influence, it can even happen that a determining of the particular process variable is no longer reliably possible at all. Especially important, furthermore, is the case, in which the frequency of a disturbing influence in the ongoing measurement operation of the vibronic sensor is not known. If the particular process variable is a predeterminable fill level, it can happen, in such case, that the reaching of the predeterminable fill level is detected, although such is not yet true, or vice versa. For example, due to such a malfunction, an incorrect switching signal can be generated for switching a process switch element.

With the present invention, it becomes advantageously possible to detect, in given cases present, disturbing influences. Such can then, for example, be taken into consideration, compensated or even eliminated for determining and/or monitoring the particular process variable.

The method of the invention can be applied both for vibronic sensors with analog electronic units as well as for such with digital electronic units, such as will be explained based on the embodiments to be described below.

Figure 3:
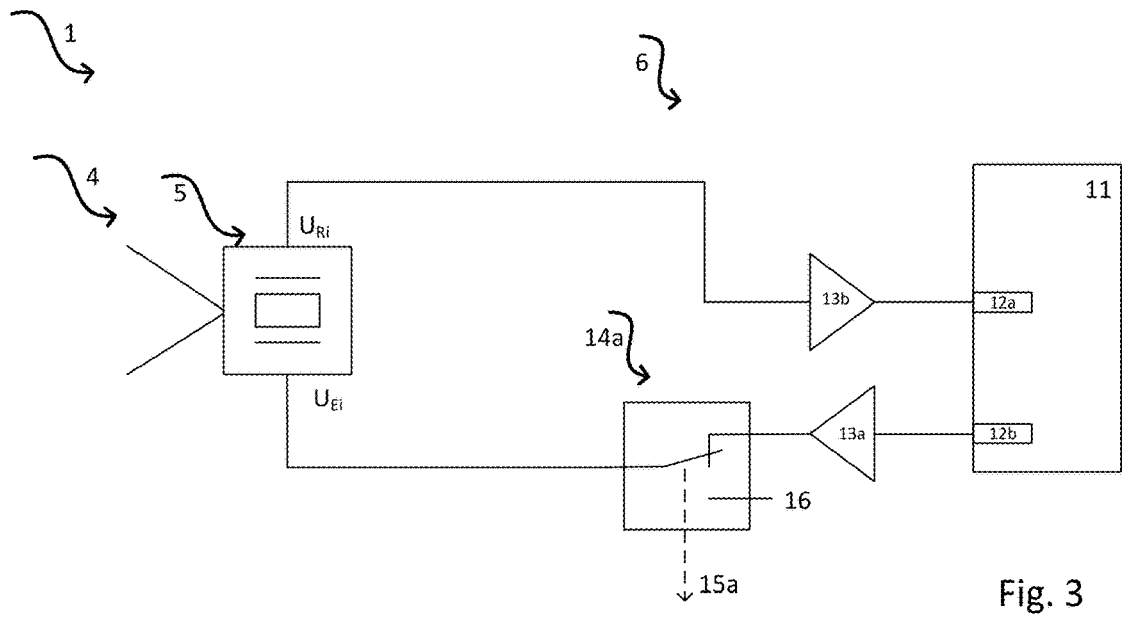
FIG. 3 shows a first electronics unit of a vibronic sensor, which electronics unit is suitable for performing a method of the present disclosure.

A first example of embodiment of the present invention is shown in FIG. 3 and relates to the case of a digital electronics unit 6 comprising a computing unit 11, here in the form of a microcontroller. By means of the microcontroller, a first excitation signal $U_{E1}$ is produced, by means of which the oscillatable unit 4 is excited, such that it executes mechanical oscillations. The oscillations of the oscillatable unit 4 are, in turn, converted by means of the driving/receiving unit into a first electrical, received signal $U_{R1}$ and fed to the microcontroller 11. The determining and/or monitoring of the particular process variable, for example, a predetermined fill level, the density and/or the viscosity of the medium 2, occurs based on the first received signal $U_{R1}$.

In the embodiment shown here, the signal path of the electronics unit optionally contains a digital-analog converter (DAC) 12b, an analog-digital converter (ADC) 12a, as well as two amplification units 13a, 13b.

The switch element 14a serves to switch back and forth between the first and the second operating modes. The switch element is controlled by the microcontroller 11 using a control signal 15a. In the configuration of the switch element 14a shown in FIG. 3, the vibronic sensor is located in the first operating mode, which corresponds to normal measurement operation. Useful for the normal measurement operation are, in such case, in principle, all measuring methods known from the state of the art, especially those mentioned, by way of example, in the above introduction, and these all fall within the scope of the present invention.

In order to change into the second operating mode, the switch element 14a is brought into its second configuration. An output 16 of the switch element 14a remains open in this configuration, so that the sensor unit 14a is uncoupled from the regular measuring path (first operating mode). During the second operating mode, thus, no second excitation signal $U_{E2}$ is produced. Rather, only a second received signal $U_{R2}$ is received from the mechanically oscillatable unit 4 and evaluated as regards at least a second frequency $f_2$, wherein the second frequency $f_2$ corresponds at least to the at least one disturbing influence.

Depending on embodiment of the method of the invention, the particular sensor can be operated exclusively in the first and second operating modes. It is, however, likewise possible to have a third operating mode, in which the vibronic sensor 1 is supplied with a third excitation signal $U_{E3}$ and in which a third received signal $U_{R3}$ is received. The third operating mode can, on the one hand, be initiated by at least a second switch element 14b (not shown). Alternatively, the first switch element 14a can also be returned to its first configuration. In that case, the first and third operating modes are distinguished within the microcontroller 11.

For purposes of simplification, the excitation signals $U_{E1}$-$U_{E3}$ and received signals $U_{R1}$-$U_{R3}$ are not separately drawn, but, instead, noted once in the form of reference character $U_{Ei}$ and $U_{Ri}$, wherein i is a number between one and three.

Figure 4:
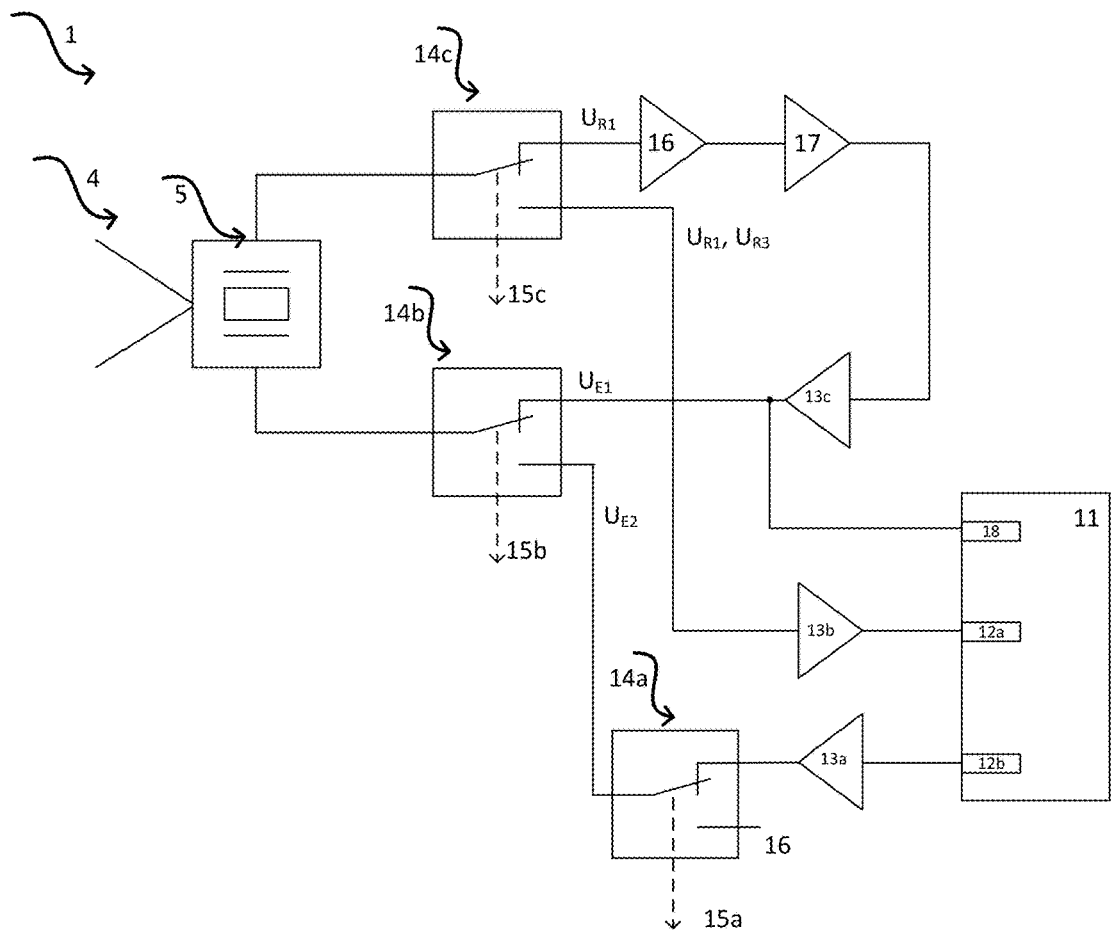
FIG. 4 shows a second electronics unit of a vibronic sensor, which electronics unit is suitable for performing a method of the present disclosure.

A second embodiment is based on the block diagram shown in FIG. 4. This embodiment is suited especially for a vibronic sensor 1 with an at least partially analog electronics unit 6. For producing the first excitation signal $U_{E1}$ starting from the first received signal $U_{R1}$ and for setting the predeterminable phase shift $\Delta\Phi$ between the first excitation signal $U_{E1}$ and the first received signal $U_{R1}$ in the first operating mode, the electronics unit includes a bandpass filter 16 and a phase shifter 17.

The switch elements 14a-14c serve for switching back and forth between the first and second, or first, second and third operating modes. The switch elements 14a-14c are, in such case, controlled via the microcontroller 11 by means of control lines 15a-15c analogously to the embodiment of FIG. 3. In the second and/or third operating mode, no excitation signal and/or the third excitation signal $U_{E3}$ is produced by means of the microcontroller and the particular second $U_{R2}$ and/or third $U_{R3}$ received signal is evaluated by means of the microcontroller at least relative to the at least a second $f_2$ and/or third $f_3$ frequency. By means of the timer 18, the microcontroller 11 can, furthermore, determine the at least a first frequency $f_1$ of the first received signal $U_{R1}$ and determine and/or monitor the particular process variable.

Independently of the exact embodiment of the electronics unit 6 of the vibronic sensor, either the at least a first, second and/or third frequency can be compared with one another, or a first, second and/or third frequency spectrum can be produced.

The invention claimed is:

1. A method for determining a process variable of a medium using a vibronic sensor, comprising:
   exciting an oscillatable unit with a first electrical excitation signal in a first operating mode such that it executes mechanical oscillations;
   receiving the first operating mode mechanical oscillations of the mechanically oscillatable unit and converting the received first operating mode mechanical oscillations into a first electrical, received signal having a first frequency;
   evaluating the first received signal relative to the process variable;
   receiving mechanical oscillations of the oscillatable unit in a second operating mode and converting the received second operating mode mechanical oscillations into a second electrical, received signal;
   ascertaining a second frequency of the second electrical, received signal; and
   associating the second frequency with a first disturbing influence on the vibronic sensor.

2. The method as claimed in claim 1, further comprising:
   performing a state monitoring based on a comparison of the first electrical, received signal and the second electrical received signal, including a comparison of the first frequency and the second frequency.

3. The method as claimed in claim 2, further comprising:
   detecting, based on the comparison, whether the first received signal is influenced by the first disturbing influence.

4. The method as claimed in claim 1,
   wherein the oscillatable unit is excited in the first operating mode such that it executes mechanical oscillations at a resonant frequency.

5. The method as claimed in claim 1,
   wherein, during the first operating mode, the first excitation signal is produced relative to the first received signal such that a predeterminable phase shift is present between the first excitation signal and the first received signal.

6. The method as claimed in claim 1,
   wherein the first disturbing influence is an oscillation, including a mechanical or electrical oscillation.

7. The method as claimed in claim 1, further comprising:
   producing a third electrical excitation signal in a third operating mode;
   exciting the oscillatable unit with the third excitation signal; and
   receiving from the oscillatable unit a third electrical, received signal having a third frequency.

8. The method as claimed in claim 7,
   wherein the first and/or third excitation signal is a signal of variable frequency.

9. The method as claimed in claim 7, further comprising:
   producing a first, second and/or third frequency spectrum of the vibronic sensor based on the first, second and/or third received signal.

10. The method as claimed in claim 8,
    wherein the second and/or third operating modes are/is performed at a first and a second point in time, and wherein, based on a comparison of the second and/or third received signal at the first and second points in time, the presence of a defect of at least one component at or in a measuring point, at or in which the vibronic sensor is applied, or the presence of a changed process state, is determined.

11. The method as claimed in claim 7, further comprising:
producing an adapted first received signal from the second and/or third received signal, including from the second and/or third frequency or from the second and/or third frequency spectrum, wherein the adapted first receive signal has an adapted first frequency or an adapted first frequency spectrum, and
determining the process variable from the first adapted received signal.

12. The method as claimed in claim 1,
wherein the process variable is a predetermined fill level of medium in a container, the density of the medium, and/or the viscosity of the medium.

13. An apparatus for determining and/or monitoring at least one process variable of a medium in a container, comprising:
an electronics unit; and
a mechanically oscillatable unit,
wherein the electronics unit is embodied to:
  excite the oscillatable unit with a first electrical excitation signal in a first operating mode such that it executes mechanical oscillations;
  receive the first operating mode mechanical oscillations of the mechanically oscillatable unit and convert the received first operating mode mechanical oscillations into a first electrical, received signal having a first frequency;
  evaluate the first received signal relative to the process variable;
  receive mechanical oscillations of the oscillatable unit in a second operating mode and convert the received second operating mode mechanical oscillations into a second electrical, received signal;
  ascertain a second frequency of the second electrical, received signal; and
  associate the second frequency with a first disturbing influence on the mechanically oscillatable unit.

14. The apparatus as claimed in claim 13, wherein the electronics unit is further embodied to:
  produce a third electrical excitation signal in a third operating mode;
  excite the oscillatable unit with the third excitation signal; and
  receive from the oscillatable unit a third electrical, received signal having a third frequency.

15. The apparatus as claimed in claim 14,
wherein the electronics unit includes a switch for switching back and forth between the first operating mode and the second operating mode, or at least two switches for switching back and forth between the first, second and/or third operating modes.

16. Apparatus as claimed in claim 13,
wherein the mechanically oscillatable unit is an oscillatory fork, a single tine, or a membrane.

* * * * *